No. 779,229. PATENTED JAN. 3, 1905.
R. W. MANSFIELD.
EDUCATIONAL GAME.
APPLICATION FILED SEPT. 23, 1903.
Fig. 1.
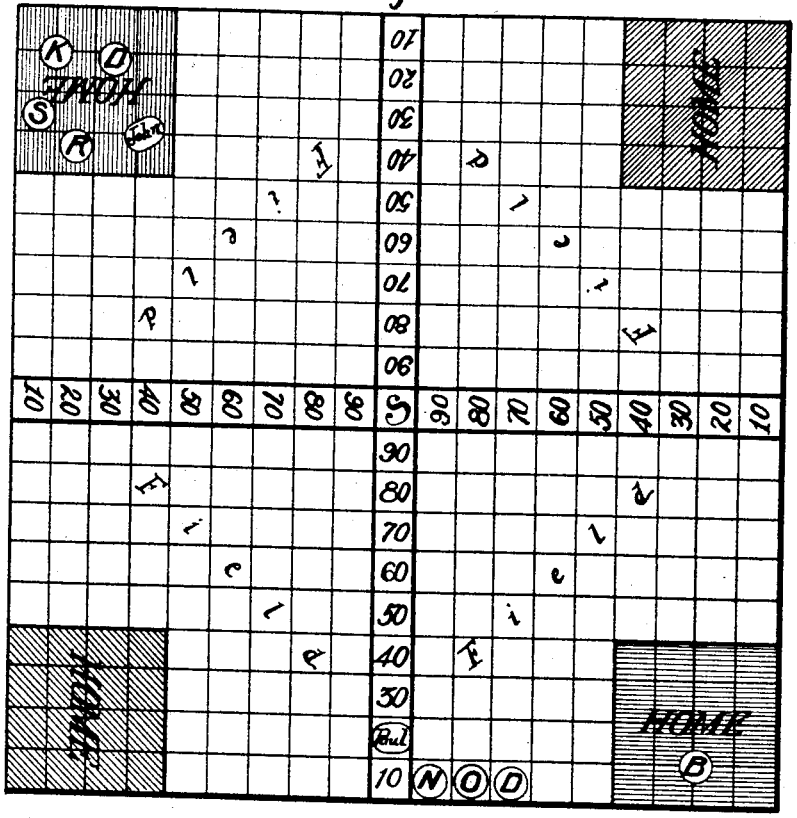
Fig. 3.
Fig. 2.
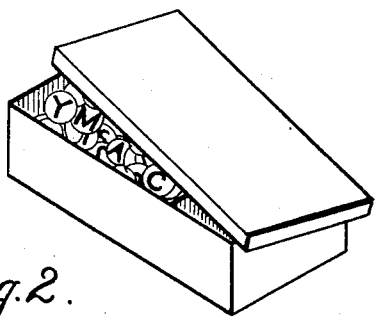
WITNESSES:
George V. Rasmussen
Wm. A. Cowan
INVENTOR
Richard W. Mansfield.
BY
ATTORNEY No. 779,229.

Patented January 3, 1905.

UNITED STATES PATENT OFFICE.

RICHARD W. MANSFIELD, OF NEW LONDON, CONNECTICUT.

EDUCATIONAL GAME.

SPECIFICATION forming part of Letters Patent No. 779,229, dated January 3, 1905.

Application filed September 23, 1903. Serial No. 174,246.

*To all whom it may concern:*

Be it known that I, RICHARD W. MANSFIELD, a citizen of the United States, residing at New London, in the county of New London, State of Connecticut, have invented certain new and useful Improvements in Educational Games, of which the following is a full, clear, and exact description.

My invention relates to educational apparatus, and particularly to a game for instruction and amusement.

The object of my invention is to provide a simple and interesting educational device for children, which is, however, susceptible of modifications which will make it attractive to older people.

The apparatus consists of a board divided up into spaces and an assortment of checkers or disks bearing letters of the alphabet for moving or playing thereon. Each player may be provided with a counter to indicate the progress of the game. Each player draws a given number of lettered checkers and plays them on the board as his turn comes around, spelling words of as many letters as may be determined upon. As each word is spelled on the spaces of the board the player moves his counter one space toward the goal. When a player has the opportunity but neglects to spell a word, his next opponent may take the word and move the counter of the person failing backward to signify failure. The rules of the game may be modified to suit the players; but the principal form is very simple and has been found intensely interesting for young people.

The spelling of different words and the consequent search for new ones has proved of great educational utility in various games, and it is aimed by my invention to make it more attractive and progressive, adding the elements of competition.

In the drawings, Figure 1 is a representation of a board with checkers and counters for two players and shows the position after a play has been made. Fig. 2 shows in perspective a box divided into two compartments for the checkers and the men, the cover being partially slipped off. Fig. 3 shows in perspective two counters.

The board, which may be folded down the center, has a center square S, with numbered "paths" leading to it from the edges of the board. The rectangular portions of the board between these paths are called "fields" and are divided up into squares. Each field has a "home" in one corner.

Each player draws a certain number of lettered checkers from an assorted and mixed quantity in the box. In the example shown there are two players, who sit opposite each other, and each player has a counter and draws at random four checkers at the start of the game. The first player to draw a vowel places his counter on the first numbered space of the path at his left. It is now his turn to begin playing. Let us suppose it has been agreed to play a game in which words of three letters are formed. If the player can form a word from the letters which he has drawn, he spells it out, placing the word on the first parallel line, as "N-O-D." These lines are marked off equally into squares, on which the lettered checkers are to be placed. When a word is spelled, the player advances his counter one more space to the second numbered space of the path. The player then draws two more checkers and, if he is able, spells another word in a manner similar to the first, moving his counter accordingly. When he has spelled two words, he still only draws two checkers and of course cannot spell another three-letter word. It is then the opponent's turn to play in the same manner. If the opponent finds on inspecting the first player's checkers that a word might have been formed by him in his turn, then the opponent may move his own counter ahead and the first player may not then spell the word discovered, but must wait his turn to play. If it happen on the first drawing of the counters that neither player has a vowel, then the players continue to draw checkers one at a time until one or the other draws a vowel, when the play begins; but in this case neither player can move his counter onto the path until he spells a word.

As a penalty for forming combinations which are not real words or which do not fall within the class agreed upon in the game beforehand the player must move his counter backward.

The game continues after play has begun until one player or the other moves his counter to the center S, which signifies that he has won. A player may win by getting his counter to the center first although he has not filled his field with words, because he is quick to detect possible words of his opponent. For the reverse reason a player may fill his field and still not win because of his mistakes. This lends a strong incentive to careful and yet quick thinking.

The corners of the board or home spaces may be appropriately colored. Each counter may bear the name of the player, and so lend attractiveness and interest to the game. For four players the board is divided as shown in Fig. 1, so that there are four home spaces, four fields, and four paths to the center or goal.

The game may be varied by using a different number of checkers to start and allowing each player to draw a different number after each play. The difficulty is increased by restricting the character of the words to be spelled—as for instance, permitting each player to spell only proper names, &c., or words of a certain part of speech, as nouns, verbs, &c. The game has proved particularly useful for boys of twelve to eighteen years of age, but is also interesting to younger and older people.

What I claim is—

1. In a game apparatus, the combination with a board having fields and distinguishing paths, of a set of alphabetical checkers for spelling words on the fields and counters for moving on the paths to indicate the progress of the game.

2. In a game apparatus, the combination with a board having intersecting paths and fields between the paths divided into spaces, of a plurality of lettered checkers for playing on the board and counters for moving on the paths.

3. In a game apparatus, a board having distinguishing paths leading from the centers of the edges to the center of the board and intersecting, home spaces in the corners, and fields between the paths and the home spaces divided into smaller spaces of uniform color, substantially as described.

Signed at New London, Connecticut, this 15th day of September, 1903.

RICHARD W. MANSFIELD.

Witnesses:
 FRANK L. McGUIRE,
 SIDNEY H. MINER.